United States Patent
Nagasawa et al.

(10) Patent No.: US 7,326,261 B2
(45) Date of Patent: Feb. 5, 2008

(54) SURFACE-MOUNT CAPACITOR AND METHOD OF PRODUCING THE SAME

(75) Inventors: Toshihisa Nagasawa, Toyama (JP); Kenji Araki, Toyama (JP); Hitoshi Takata, Toyama (JP); Akihiro Kawai, Toyama (JP); Shinji Arai, Toyama (JP)

(73) Assignees: NEC Tokin Corporation, Sendai-shi (JP); NEC Tokin Toyama, Ltd., Toyama (JP)

( * ) Notice: Subject to any disclaimer, the term of this patent is extended or adjusted under 35 U.S.C. 154(b) by 0 days.

(21) Appl. No.: 11/681,112

(22) Filed: Mar. 1, 2007

(65) Prior Publication Data

US 2007/0148900 A1   Jun. 28, 2007

Related U.S. Application Data

(62) Division of application No. 11/260,831, filed on Oct. 27, 2005, now Pat. No. 7,206,193.

(30) Foreign Application Priority Data

Oct. 27, 2004  (JP) .............................. 2004-311928

(51) Int. Cl.
*H01G 9/00* (2006.01)
(52) U.S. Cl. ................. 29/25.03; 361/523; 361/524; 361/528; 361/529; 257/E21.008
(58) Field of Classification Search ............. 361/524, 361/528, 529
See application file for complete search history.

(56) References Cited

U.S. PATENT DOCUMENTS

| | | | |
|---|---|---|---|
| 6,970,344 B2 | 11/2005 | Arai et al. | |
| 6,977,807 B2 * | 12/2005 | Arai et al. | 361/523 |
| 6,989,982 B2 | 1/2006 | Kobayashi et al. | |
| 2004/0174660 A1 * | 9/2004 | Arai et al. | 361/523 |
| 2005/0213287 A1 | 9/2005 | Yoshihara et al. | |
| 2006/0193106 A1 | 8/2006 | Kobayashi et al. | |

FOREIGN PATENT DOCUMENTS

| | | |
|---|---|---|
| JP | 2004-55699 A | 2/2004 |
| JP | 2004-289142 A | 10/2004 |
| KR | 2002-0074339 | 9/2002 |
| KR | 2004-0010163 | 1/2004 |

* cited by examiner

*Primary Examiner*—Michael Lebentritt
*Assistant Examiner*—Kyoung Lee
(74) *Attorney, Agent, or Firm*—Frishauf, Holtz, Goodman & Chick, P.C.

(57) ABSTRACT

A surface-mount capacitor includes a multilayer capacitor structure formed by laminating plate-like capacitor elements each having anode lead portions at opposite ends thereof and a cathode portion at the center, an anode terminal connected to each anode lead portion via a strip-like plate, and a cathode terminal connected to the cathode portion. The anode and the cathode terminals and have a flat shape and are formed on a common plane as a substrate-mounted surface. A mold resin case has a bottom portion filling a gap between the anode and the cathode terminals and mechanically connecting the anode and the cathode terminals and sidewalls substantially perpendicular to the substrate-mounted surface. The anode and the cathode terminals have upper surfaces exposed on an inner bottom surface of the mold resin case to be connected to the anode lead portions and the cathode portion.

8 Claims, 17 Drawing Sheets

SURFACE-MOUNT CAPACITOR AND METHOD OF PRODUCING THE SAME

The present application is a Divisional Application of U.S. application Ser. No. 11/260,831 filed Oct. 27, 2005, now U.S. Pat. No. 7,206,193, which claims priority to prior Japanese patent application JP 2004-311928, the disclosures of which are incorporated herein by reference.

BACKGROUND OF THE INVENTION

This invention relates to a surface-mount capacitor for a power supply line and, in particular, to a surface-mount capacitor suitable for use in a decoupling circuit for a stabilized power supply connected to a CPU and a method of producing the same.

Development has been made of a surface-mount capacitor which is called a transmission-line element or a transmission-line noise filter and which has characteristics of both a capacitor and a filter, with a capacitance of several hundreds of microfarads, an ESR (equivalent series resistance) of 5 mΩ in a frequency band of 100 MHz, and an ESL (equivalent series inductance) of about 1 pH. The above-mentioned surface-mount capacitor comprising a unit capacitor element is particularly suitable for use in a decoupling circuit of a power supply line connected to a CPU. Such a surface-mount capacitor is disclosed, for example, in Japanese Unexamined Patent Application Publication (JP-A) No. 2004-55699.

Development is under way of a multilayer-type surface-mount capacitor formed by laminating or stacking a plurality of such unit capacitor elements and electrically connecting the unit capacitor elements in parallel so as to improve an electrostatic capacitance. The surface-mount capacitor of the type is operable as a high-performance surface-mount capacitor in a power supply line of a personal computer (PC), a server, a digital home electric appliance, telecommunication equipment, and so on which are improved towards a higher operation speed and a higher frequency. The technique of the above-mentioned surface-mount capacitor of a multilayer type is described in Japanese Patent Publication No. 2004-289142 filed by the present inventors.

Referring to FIG. 1, such a surface-mount capacitor of a multilayer type will be described. In the illustrated example, the surface-mount capacitor includes five capacitor elements. In each capacitor element, a foil-like or a sheet-like valve action metal is enlarged in surface area to produce an anode member. On the anode member, a dielectric coating film is formed. Further, a cathode portion 202 including a solid electrolyte and a conductive material is formed. Opposite ends of the anode member are separated or isolated by insulating resin layers 203 from the cathode portion 202 and serve as anode lead portions 201. To each of the anode lead portions 201, a U-shaped metal plate 204 is attached by ultrasonic welding and connected to upper and lower adjacent ones of the capacitor elements via a conductive paste 205. A lowermost one of the U-shaped metal plates 204 is connected to an anode terminal 206 via the conductive paste 205.

The cathode portion 202 of each capacitor element is connected to the cathode portions of the upper and the lower adjacent capacitor elements via the conductive paste 205. A lowermost one of the cathode portions 202 is mechanically connected to a cathode terminal 208 through a prepreg 207a provided with a hole and is electrically connected to the cathode terminal 208 through the conductive paste 205 filled in the hole.

To an uppermost one of the capacitor elements, a shielding metal plate 209 is adhered through a prepreg 207b provided with a hole. Through the conductive paste 205 filled in the hole, the cathode portion 202 of the uppermost capacitor element is electrically connected to the shielding metal plate 209.

Depending upon the intended use, further improvement in dimensional accuracy and higher reliability are required. For example, it is requested to achieve higher accuracy in external dimension, terminal dimension, and terminal-to-terminal dimension, improvement in coplanarity of terminal mount surfaces, enhancement of connection strength of terminals, reduction of warping in a reflow soldering step. Furthermore, a fillet forming portion is required in order to confirm a soldering state upon mounting. In addition, it is also required to improve the stability of an internal resistance of the cathode portion during long-term use.

In a production process of the surface-mount capacitor, there are various problems. For example, in ultrasonic welding of the anode lead portion, deformation due to thermal expansion is large so that the improvement in dimensional accuracy is not easy. Further, it is not easy to prevent protrusion or leakage of the prepreg or the conductive paste used for connection and to reduce a stress applied to the capacitor element in each step. As a whole, the production process is inevitably complicated. It is therefore difficult to reduce the number of steps and to improve the yield.

SUMMARY OF THE INVENTION

Under the circumstances, it is an object of this invention to provide a surface-mount capacitor which has a surface-mount terminal high in connection strength and excellent in moutability, which is high in accuracy of external dimension, which has a high reliability in long-term stability of electric characteristics, and which is excellent in productivity.

It is another object of this invention to provide a method of fabricating such a surface-mount capacitor.

According to this invention, there is provided a surface-mount capacitor comprising a capacitor member comprising at least one capacitor element having an anode lead portion formed at an end portion thereof and a cathode portion formed at a center thereof, an anode terminal connected to the anode lead portion, and a cathode terminal connected to the cathode portion, wherein: the anode terminal and the cathode terminal have a flat shape and formed on a common plane as a substrate-mounted surface; the surface-mount capacitor being provided with a nonconductive case having a bottom portion filling a gap between the anode terminal and the cathode terminal and mechanically connecting the anode terminal and the cathode terminal, and side walls substantially perpendicular to the common plane; the anode terminal and the cathode terminal having a surface exposed on an inner bottom surface of the nonconductive case and connected to the anode lead portion and the cathode portion of the capacitor element.

In the above-mentioned surface-capacitor, the capacitor member may comprise a single-layer capacitor structure including a single capacitor element or a multilayer capacitor structure including a plurality of capacitor elements.

Thus, the nonconductive case, the anode terminal, and the cathode terminal are integrally coupled to thereby obtain a structure capable of achieving a high accuracy of a terminal dimension and a terminal-to-terminal dimension, improvement of coplanarity of terminal mount surfaces, and enhancement of connection strength of terminals and of relaxing a stress applied to the capacitor member disposed inside the nonconductive case. By the use of an element container or base such as the nonconductive case, it is possible to prevent the conductive paste for connection from protruding or leaking outward. Further, the number of layers of the capacitor elements can easily be changed. A variety of surface-mount capacitors from a single-layer type to a multilayer type can easily be obtained merely by changing a height of the side wall of the nonconductive case. The nonconductive case is typically a mold resin case, which is made by molding resin.

Preferably, protrusions are formed on opposite sides of the anode and the cathode terminals so as to bite into the bottom portion of the nonconductive case, each of the protrusions having an end bent towards the inside of the nonconductive case. The protrusions serve as anchors to fix the nonconductive case to the anode and the cathode terminals. By the use of such anchor structure, the anode terminal and the cathode terminal are given robustness. In addition, the element container or base for the capacitor member is given robustness.

Preferably, one protrusion is formed on each of the opposite sides of the anode and the cathode terminals and extends over a substantially entire area of each of the opposite sides. Thus, although the protrusion is only one, an anchor portion biting into the bottom portion of the nonconductive case has a large size.

Preferably, each of the anode terminal and the cathode terminal is provided with a protruding portion bent away from the substrate-mounted surface so as to bite into the side walls of the nonconductive case. The protruding portion serves as an anchor to fix the nonconductive case to the anode and cathode terminals. By such anchor structure, coupling between the side wall and the anode terminal or the cathode terminal is strengthened.

Preferably, the bottom portion of the nonconductive case is provided with a groove formed on a substrate-mounted side at a part filling the gap between the anode terminal and the cathode terminal. The groove serves to prevent paste vapor generated upon melting of a solder from accumulating on a substrate-mounted surface and pushing up the capacitor member and serves as a trap for excessive solder. In this event, the groove may have any desired sectional shape. It is essential that an entire area of the bottom surface of the product is not adhered to the substrate-mount surface but an open space is formed.

Preferably, each of the anode terminal and the cathode terminal has a fillet forming portion formed at an end thereof by crushing with a plating surface kept intact. By the fillet forming portion, it is possible to allow lifting of molten solder along a plating surface, to form a solder fillet, and to thereby confirm a soldering state.

Preferably, the nonconductive case is provided with a reinforced portion increased in thickness and formed at a corner portion where the side walls intersect each other. By the reinforced portion, the strong nonconductive case is formed. It is therefore possible to reduce warping of the bottom surface of the product during reflow soldering or to improve the mechanical strength of the product.

Preferably, a nonconductive resin is filled inside the nonconductive case to cover the cathode portion of the capacitor member. The nonconductive resin is for example a silicone resin. In this manner, it is possible not only to provide the capacitor element with an antivibration effect but also to prevent an increase in ESR due to reaction between the cathode portion and oxygen.

Preferably, the surface-mount capacitor includes the multilayer capacitor structure composed of a plurality of the capacitor elements, wherein a conductive paste is applied to establish electrical connection: (a) between at least one principal surface of a cathode portion of one of the capacitor elements and a principal surface of a cathode portion of another one of the capacitor elements; (b) across side surfaces of the capacitor elements each of which is substantially perpendicular to one of the principal surfaces; and (c) between a principal surface of a cathode portion of one of the capacitor elements and the cathode terminal. Thus, by applying the conductive paste so as to surround the principal surface and the side surface of the cathode portion and connecting the cathode portion to those of other capacitor elements, ESR can be reduced.

Preferably, the multilayer capacitor structure is disposed inside the nonconductive case, the anode lead portions of two capacitor elements adjacent to each other in a laminating direction being connected to each other via a strip-like plate of copper or copper alloy. By the use of the strip-like plate, connection reliability of the anode lead portion is improved.

Preferably, the anode lead portion is made of aluminum as a valve action metal, and the strip-like plate connected to the anode lead portion is plated with Ni. As described above, between aluminum and copper or copper alloy, a plating layer, such as Ni or Pd, having a higher melting point is interposed. With this structure, heat generation during welding and mutual diffusion of metal elements are controlled and strong bond is achieved.

Preferably, the strip-like plate connected to a substrate-mounted side of the anode lead portion of one of the capacitor elements that is nearest to the substrate-mounted surface is connected to the anode terminal via a conductive paste. By such connection structure using the conductive paste, a stress applied to the capacitor element upon connection is reduced.

Preferably, the surface-mount capacitor further includes a cap covering an upper portion of the nonconductive case. By the cap, the capacitor element is isolated from an external environment and a robust element container is obtained.

Preferably, the surface-mount capacitor further include an exterior case of a box-like shape covering an upper portion and a part of the side walls of the nonconductive case. By the exterior case, the capacitor element is isolated from an external environment and a robust element container is obtained. In addition, the appearance of the product is beautifully designed.

Preferably, an end of the exterior case on a substrate-mounted side is located above upper surfaces of the anode and the cathode terminals. With this structure, it is possible to prevent the exterior case from contacting the anode terminal or the cathode terminal due to thermal expansion during reflow soldering to bend the terminals so that the main body of the surface-mount capacitor is lifted up from the substrate-mounted surface.

Preferably, each of the anode and the cathode terminals has an end located inside an outer surface of a side wall portion of the exterior case. With this structure, the end of each terminal is prevented from colliding with other objects.

Preferably, the exterior case and the nonconductive case are bonded by an adhesive. By adjusting the state of application of the adhesive, appropriate fixing force is obtained. In addition, the exterior case and the mold resin case can be separated again by appropriate force.

Preferably, the exterior case is connected to the nonconductive case by fitting using elastic deformation. By selecting this structure, the number of steps for bonding is extremely reduced. In addition, the exterior case and the mold resin case can be separated again by appropriate force.

According to this invention, there is also provided a method of producing a surface-mount capacitor, including the steps of: producing a capacitor element by forming a surface-expanding etching layer and a dielectric coating film on a plate or a foil of a valve action metal, thereafter isolating an end portion by an insulating resin to form an anode lead portion, and forming a solid electrolyte layer and a conductive material layer on the dielectric coating film at a center; welding a connecting strip-like plate to the anode lead portion of the capacitor element; forming a nonconductive case having a bottom portion and a side wall portion on a lead frame provided with an anode terminal forming portion and a cathode terminal forming portion, and exposing an upper surface of the lead frame on an inner bottom surface of the nonconductive case; connecting the strip-like plate welded to the capacitor element and the cathode portion of the capacitor element to the lead frame in the nonconductive case; and connecting a cap or an exterior case at least covering an upper side of the nonconductive case to the nonconductive case. When the nonconductive case is a mold resin case, the bottom portion and the side wall portion of the case are made by, for example, insert molding. Thus, the box-like nonconductive case having an open upper end is formed on the lead frame, for example, by insert molding. In the nonconductive case, the capacitor element is accommodated. Thus, mass production is carried out with high accuracy.

According to this invention, there is also provided a method of producing a surface-mount capacitor, including the steps of: producing a capacitor element by forming a surface-expanding etching layer and a dielectric coating film on a plate or a foil of a valve action metal, thereafter isolating an end portion by an insulating resin to form an anode lead portion, and forming a solid electrolyte layer and a conductive material layer on the dielectric coating film at a center; forming a multilayer capacitor structure by laminating the capacitor elements after a connecting strip-like plate is welded to the anode lead portion of each of the capacitor elements; forming a nonconductive case having a bottom portion and a side wall portion by insert molding on a lead frame provided with an anode terminal forming portion and a cathode terminal forming portion, and exposing an upper surface of the lead frame on an inner bottom surface of the nonconductive case; connecting the strip-like plate at a lowermost part of the multilayer capacitor structure and the cathode portion of the multilayer capacitor structure to the lead frame in the nonconductive case; and connecting a cap or an exterior case at least covering an upper side of the nonconductive case to the nonconductive case. Thus, the box-like nonconductive case having an open upper end is formed on the lead frame by insert molding. In the nonconductive case, the multilayer capacitor structure is accommodated. Thus, mass production is carried out with high accuracy.

Preferably, the strip-like plate is made of copper or copper alloy subjected to plating, the strip-like plate being welded to the anode lead portion by resistance welding after the etching layer of the anode lead portion is removed. By removing the etching layer as mentioned above, the bonding strength upon resistance welding is increased and the yield is improved.

Preferably, the strip-like plate is made of copper or copper alloy subjected to plating, the strip-like plate being welded by laser welding after the etching layer of the anode lead portion is removed. By removing the etching layer also in case of the laser welding, the bonding strength upon welding is increased and the yield is improved.

Preferably, in the step of forming the multilayer capacitor structure by laminating the capacitor elements after a connecting strip-like plate is welded to the anode lead portion of each of the capacitor elements, laser welding is carried out by setting an irradiating position such that a part of a laser beam section spreads beyond an end of each of the anode lead portion and the strip-like plate and irradiating the laser beam so that the laser beam penetrates or passes through the anode lead portions and the strip-like plates of all the capacitor elements and that a welded portion is exposed on an end face of the multilayer capacitor structure. By the laser welding, the anode lead portions of the multilayer capacitor structure are simultaneously bonded. In addition, if the laser were cast at an inner position, for example, at the center of the anode lead portion, then a through hole of a closed circle would penetrate the anode lead portion and melting occurs in the through hole. In this case, part of melted material may often adhere to an internal surface of the through hole to be confined or accumulated in the through hole. On the other hand, according to this technique, since the welded portion is exposed on an end face of the multilayer capacitor structure, an excellent welding mark (penetration) is formed without confinement or accumulation of the melted material in the closed through hole.

Preferably, in the step of forming the multilayer capacitor structure by laminating the capacitor elements after a connecting strip-like plate is welded to the anode lead portion of each of the capacitor elements, connection of principal surfaces of the cathode portions of the capacitor elements and connection of side surfaces of the cathode portions are simultaneously carried out by the use of a same conductive paste. Thus, by surrounding the cathode portion by the use of the same conductive paste and connecting the cathode portion to those of other capacitor elements, electrical resistance is reduced.

The surface-mount capacitor of this invention has the above-mentioned structure. Therefore, it is easy to achieve higher accuracy in external dimension, terminal dimension, and terminal-to-terminal dimension, improvement in coplanarity of terminal mount surfaces, enhancement of connection strength of terminals, reduction of warping in a reflow soldering step. It is also easy to confirm the soldering state during mounting. Further, it is possible to improve the stability of the internal resistance of the cathode portion during long-term use.

In the method of producing a surface-mount capacitor according to this invention, the production process is simplified so as to enable high-yield production with a reduced number of steps.

Thus, according to this invention, it is possible to provide a surface-mount capacitor which has a surface-mount terminal high in connection strength and excellent in moutability, which is high in accuracy of external dimension, which has a high reliability in long-term stability of electric characteristics, and which is excellent in productivity.

DESCRIPTION OF THE PREFERRED EMBODIMENTS

Figure 1:
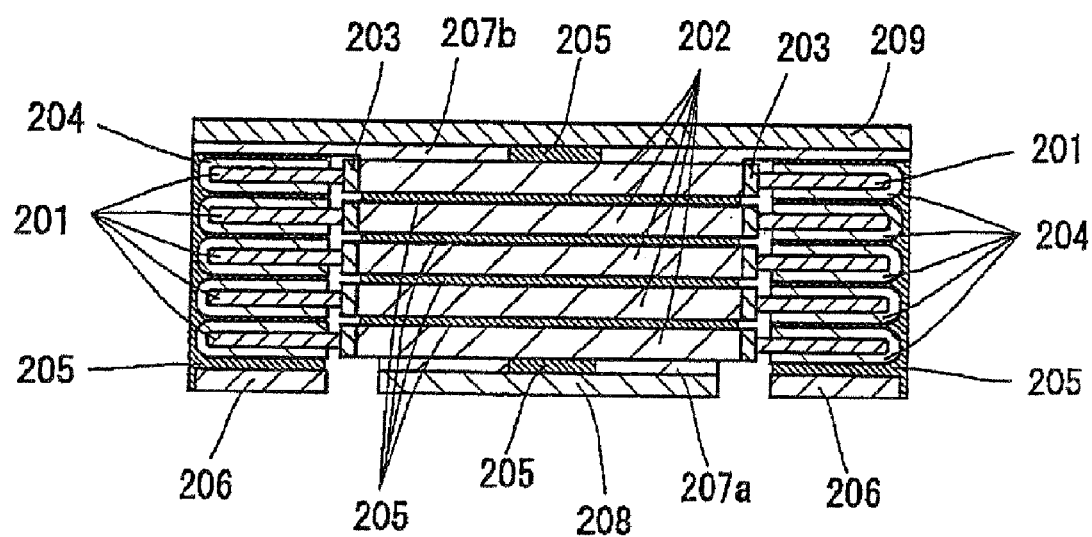
FIG. 1 is a sectional view of a conventional surface-mount capacitor of a multilayer type.

Now, this invention will be described in detail with reference to the drawing.

Figure 2A:
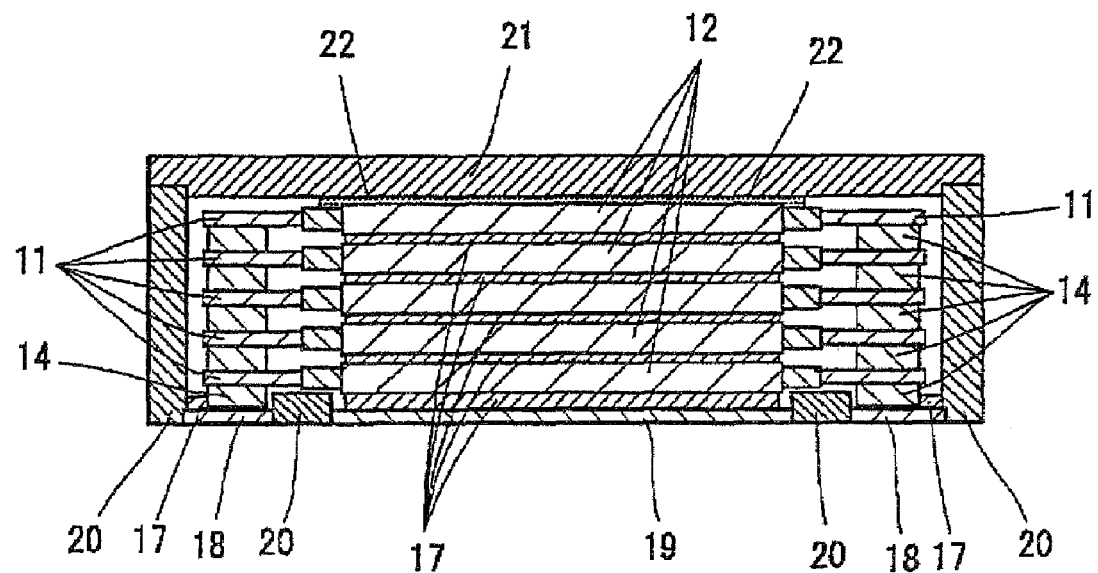
FIG. 2A is a sectional view of a surface-mount capacitor according to a first embodiment of this invention.
Figure 2B:
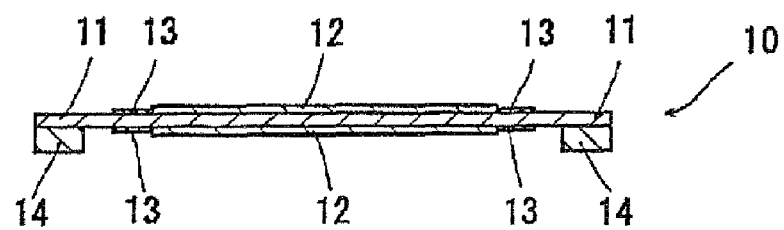
FIG. 2B is a sectional view of a capacitor element of the surface-mount capacitor illustrated in FIG. 2A.

Referring to FIGS. 2A and 2B, a surface-mount capacitor according to a first embodiment of this invention includes a plurality of (five in the illustrated example) capacitor elements 10 each having a rectangular plate-like shape and laminated into a multilayer capacitor structure.

Figure 3A:
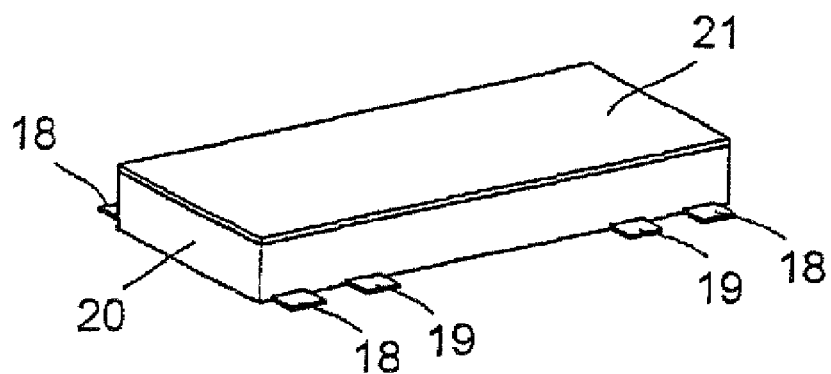
FIG. 3A is a perspective view showing an external configuration of the surface-mount capacitor according to the first embodiment of this invention.
Figure 3B:
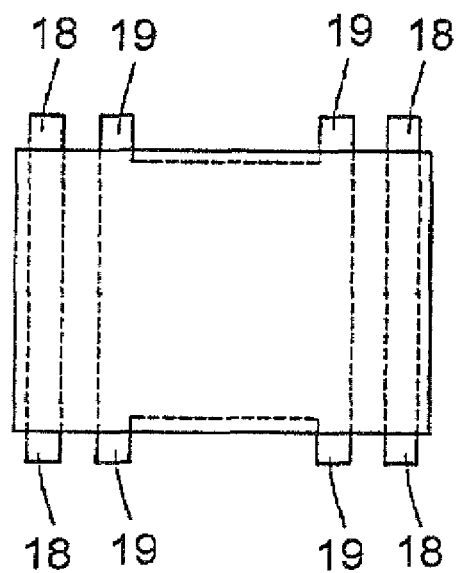
FIG. 3B is a plan view of the surface-mount capacitor illustrated in FIG. 3A.

Referring to FIGS. 3A and 3B together with FIGS. 2A and 2B, the surface-mount capacitor has anode terminals 18 connected to anode lead portions 11 of the capacitor elements 10, a cathode terminal 19 connected to cathode portions 12 of the capacitor elements 10, a mold resin case 20 accommodating the capacitor elements 10, and a cap 21 covering the mold resin case 20.

Turning back to FIGS. 2A and 2B, each capacitor element 10 has the anode lead portions 11 formed at opposite ends thereof, the cathode portion 12 formed at the center, and insulating resin layers 13 separating or isolating the anode lead portions 11 and the cathode portion 12 from each other. In FIG. 2A, a section of each capacitor element 10 is schematically shown in order to avoid complexity.

Referring to FIG. 2B, a strip-like plate 14 of copper or copper alloy is welded to each of the anode lead portions 11 of each capacitor element 10. By laminating the capacitor elements 10, the multilayer capacitor structure is formed. At this time, the anode lead portions 11 are connected by welding such as resistance welding or laser welding while the cathode portions 12 are connected by the use of a conductive paste 17. The multilayer capacitor structure is disposed inside the mold resin case 20 of a box-like shape. The mold resin case 20 is provided with the anode terminals 18 and the cathode terminal 19 formed on a bottom portion thereof by the use of a lead frame (40 in FIGS. 4A and 4B). The anode terminals 18 have upper surfaces connected via the conductive paste 17 to lower surfaces of the strip-like plates 14 welded to the lowermost anode lead portions 11. The cathode terminal 19 is connected to the lowermost cathode portion 12 via the conductive paste 17. The cap 21 is adhered to an upper portion of the mold resin case 20. In a gap between the multilayer capacitor structure and each of the cap 21 and the mold resin case 20, a silicone resin 22 is filled.

Figure 4A:
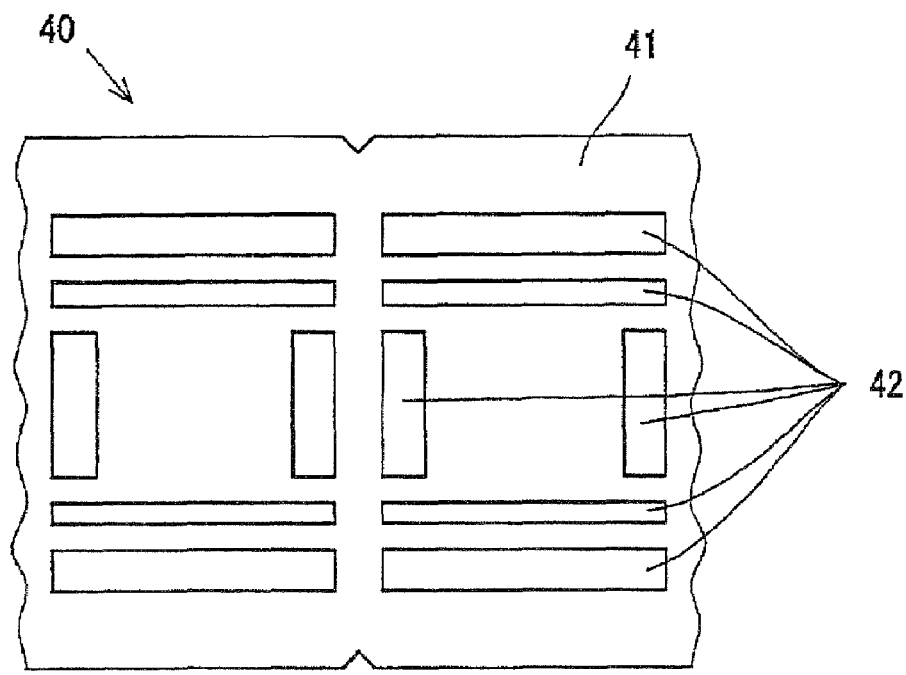
FIG. 4A is a plan view of a lead frame of the surface-mount capacitor according to the first embodiment of this invention.
Figure 4B:
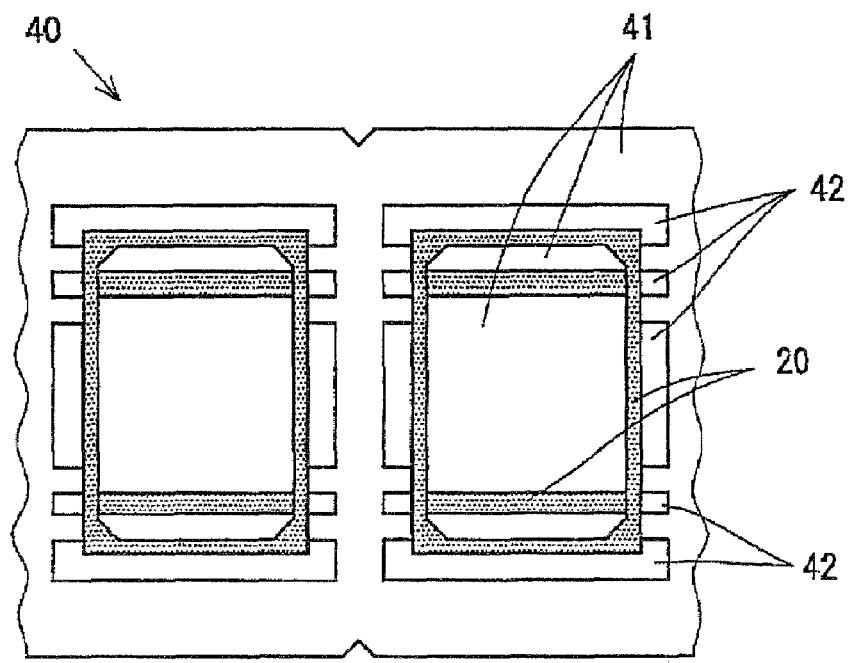
FIG. 4B is a plan view of a mold resin case formed on the lead frame illustrated in FIG. 4A.

Referring to FIGS. 4A and 4B, description will be made of a structure of the mold resin case 20 and a method of producing the same. In FIG. 4A, the lead frame has a metal part 41 and a plurality of cut portions 42. In FIG. 4B, the mold resin case 20 is formed on the lead frame 40. The bottom portion of the mold resin case 20 is formed so as to partially fill the cut portions 42. An upper surface of the metal part 41 is partially exposed on an inner bottom surface of the mold resin case 20. Inside the mold resin case 20, the multilayer capacitor structure is disposed and connected to the anode and the cathode terminals 18 and 19. By the use of the lead frame and the mold resin case mentioned above, it is possible to obtain surface-mount terminals high in dimensional accuracy of each of an external dimension, a terminal dimension, and a terminal-to-terminal dimension and excellent in coplanarity between an anode terminal surface and a cathode terminal surface.

Figure 5A:
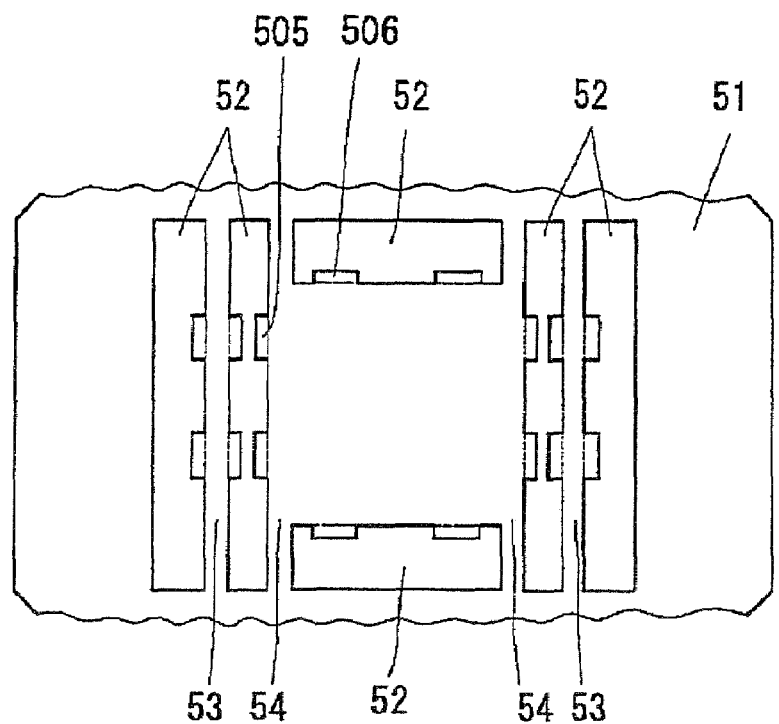
FIG. 5A is a plan view of another lead frame provided with two protrusions formed on each side to serve as anchors.
Figure 5B:
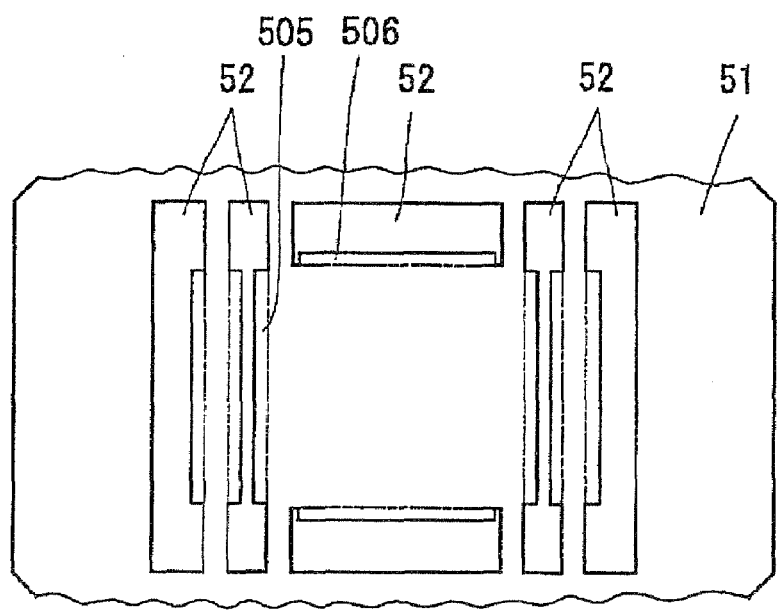
FIG. 5B is a plan view of still another lead frame provided with one protrusion formed on each side and having a maximum width.

Upon production of the mold resin case 20, lead frames illustrated in FIGS. 5A and 5B may be used. In this event, anode terminals and a cathode terminal firmly fixed to the mold resin case are obtained. Referring to FIG. 5A, the lead frame has a metal part 51, a plurality of cut portions 52, anode terminal forming portions 53, and a cathode terminal forming portion 54. The anode terminal forming portions 53 and the cathode terminal forming portion 54 serve as anode terminals and a cathode terminal. On each of opposite sides of the anode or the cathode terminal forming portion 53 or 54, two protrusions 505 or two protruding portions 506 are formed. In FIG. 4A, the cathode terminal forming portion is a central part having a generally rectangular shape with four legs at four corners. Each of the anode terminal forming portions is positioned on opposite sides of the cathode terminal forming portion and has a rectangular shape substantially parallel to the cathode terminal forming portion. On the other hand, in FIG. 5A, the cathode terminal forming portion further has four protrusions 505 and four protruding portion 506 on four sides thereof. Specifically, two protrusions 505 are formed on each of sides of the cathode terminal forming portion faced to the anode terminal forming portions. Two protruding portions 506 are formed on each of the other sides of the cathode terminal forming portion. In addition, two protrusions 505 are also formed on each of longitudinal sides of the anode terminal forming portions. The protrusions 505 and the protruding portion 506 bite into the mold resin case 20 to serve as anchors. Referring to FIG. 5B, one protrusion 505 or one protruding portion 506 having a maximum width is formed on each of opposite sides of the anode or the cathode terminal forming portion 53 or 54.

Figure 6A:
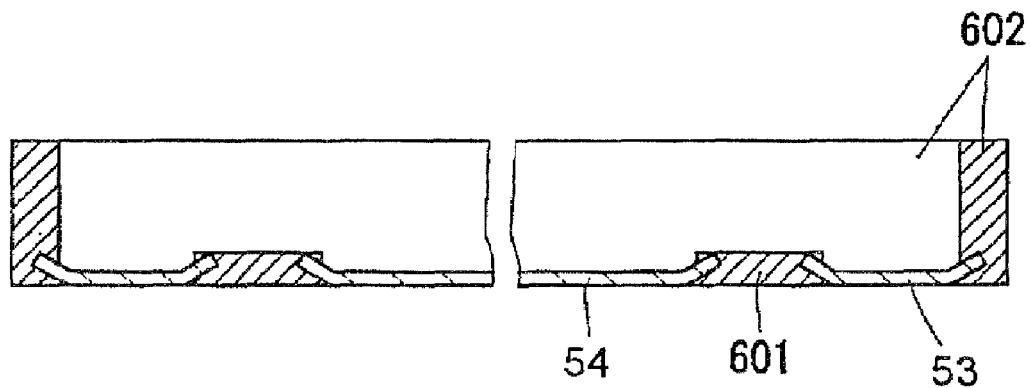
FIG. 6A is an enlarged sectional view of the mold resin case illustrated in FIG. 2A.
Figure 6B:
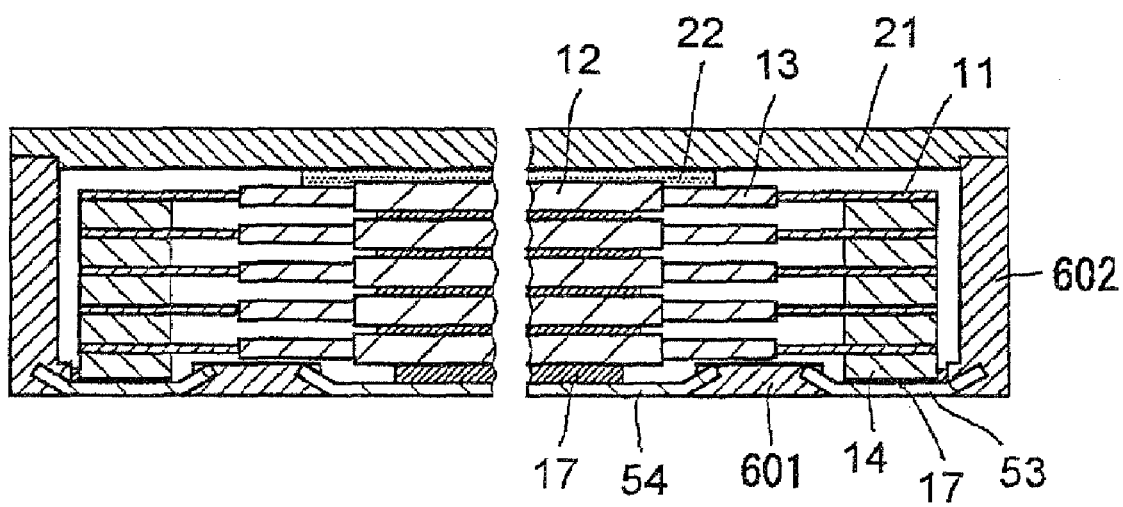
FIG. 6B is a sectional view of the surface-mount capacitor of a multilayer type using the mold resin case illustrated in FIG. 6A.

Referring to FIGS. 6A and 6B, the mold resin case 20 in FIGS. 2A and 2B will be described in detail. In FIG. 6A, an anode terminal forming portion 53 is provided with a plurality of protrusions bent upward and biting into a mold resin case bottom portion 601 and a mold resin case side wall portion 602 to serve as anchors. Similarly, a cathode terminal forming portion 54 is provided with a plurality of protrusions bent upward or away from the substrate-mounted surface and biting into the mold resin case bottom portion 601 to serve as anchors. The multilayer capacitor structure is accommodated in the mold resin case 20 so that the anode terminal forming portions 53 are connected through the conductive paste 17 to the lower surfaces of the strip-like plates 14 of the anode lead portions 11 and the cathode terminal forming portion 54 is connected through the conductive paste 17 to the lower surface of the lowermost cathode portion 12. Then, the cap 21 is fixed to the mold resin case 20 to press a silicone resin 22.

Figure 7A:
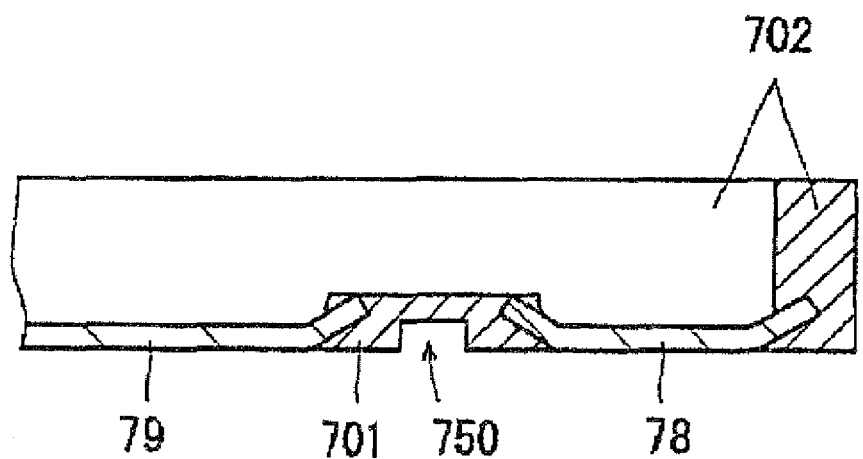
FIG. 7A is an enlarged sectional view showing a part of a modification of the mold resin case in which a groove having a rectangular section is formed.
Figure 7B:
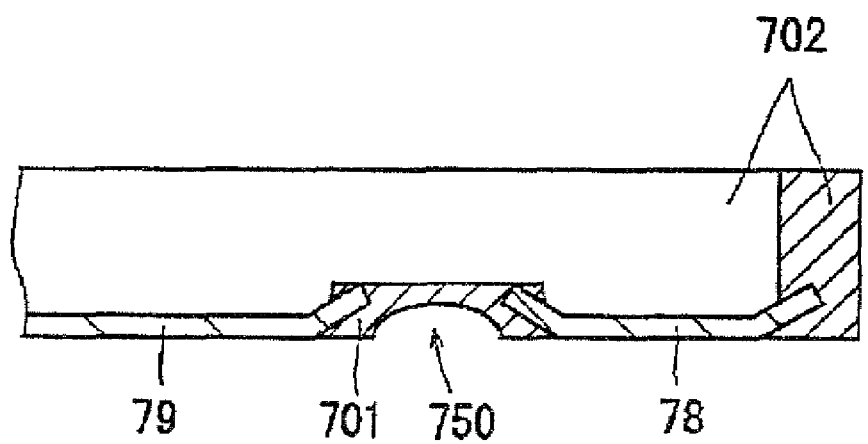
FIG. 7B is an enlarged sectional view showing a part of another modification of the mold resin case in which a groove having a semi-elliptical section is formed.

Referring to FIGS. 7A and 7B, modifications of the mold resin case 20 will be described. In these modifications, the mold resin case 20 is provided with a groove formed on a substrate-mounted side of the bottom portion thereof. In FIG. 7A, the mold resin case is provided with a groove 750 having a rectangular section. In FIG. 7B, the mold resin case is provided with a groove 750 having a semi-elliptical section. In these figures, 701 represents a mold resin case bottom portion, 702, a mold resin case side wall portion, 78, an anode terminal forming portion, and 79, a cathode terminal forming portion. By providing the groove 750 on the mold resin case bottom portion 701, it is possible to release flux vapor which is generated when solder is melted in reflow soldering during a mounting process. In addition, molten solder protruding or leaking outward can be trapped by a recessed portion of the groove 750. Therefore, a mounting position of the product is properly maintained and occurrence of incomplete insulation due to the solder protruding or leaking outward can be prevented.

Figure 8A:
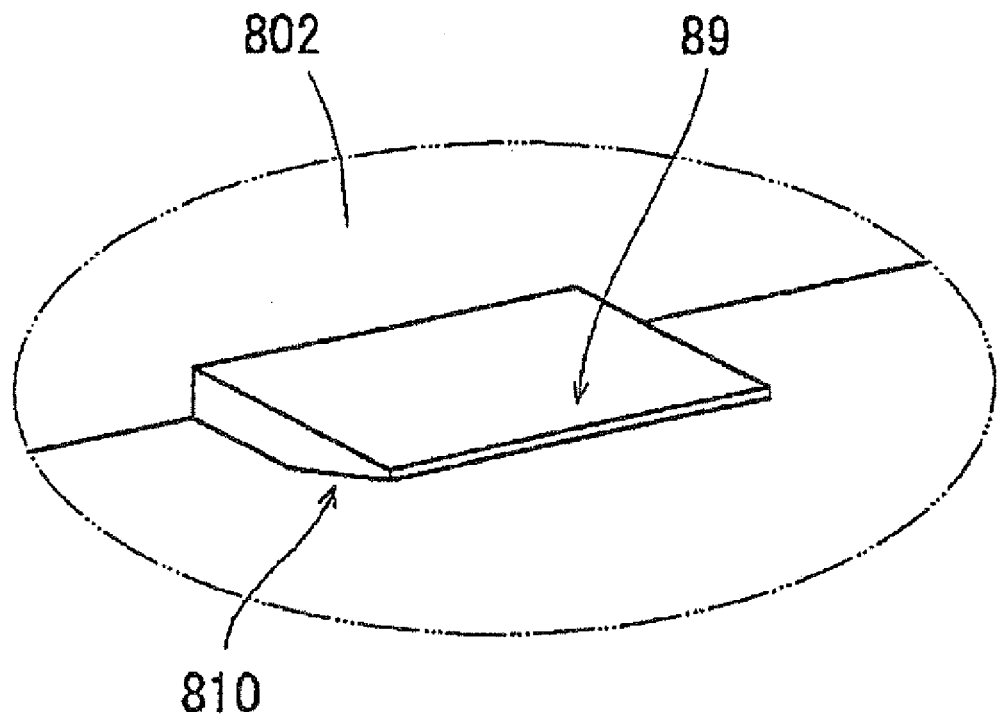
FIG. 8A is an enlarged perspective view of a fillet forming portion of an anode or a cathode terminal.
Figure 8B:
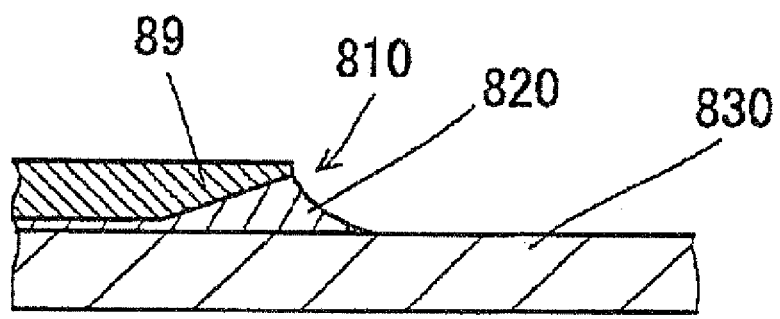
FIG. 8B is a sectional view showing a solder fillet formed after soldering.

Referring to FIGS. 8A and 8B, each of the anode and the cathode terminals may have a terminal end portion 89 provided with a fillet forming portion 810 including a recessed portion. The recessed portion is formed on the side faced to a substrate 830 by crushing so that a plating surface (such as Sn, Sn alloy, Ag, or Au) of the terminal end portion 89 is kept intact. As shown in FIG. 8B, a solder fillet 820 is formed at the fillet forming portion 810. Thus, the fillet forming portion 810 can be produced by a simple process without requiring re-plating.

Figure 9:
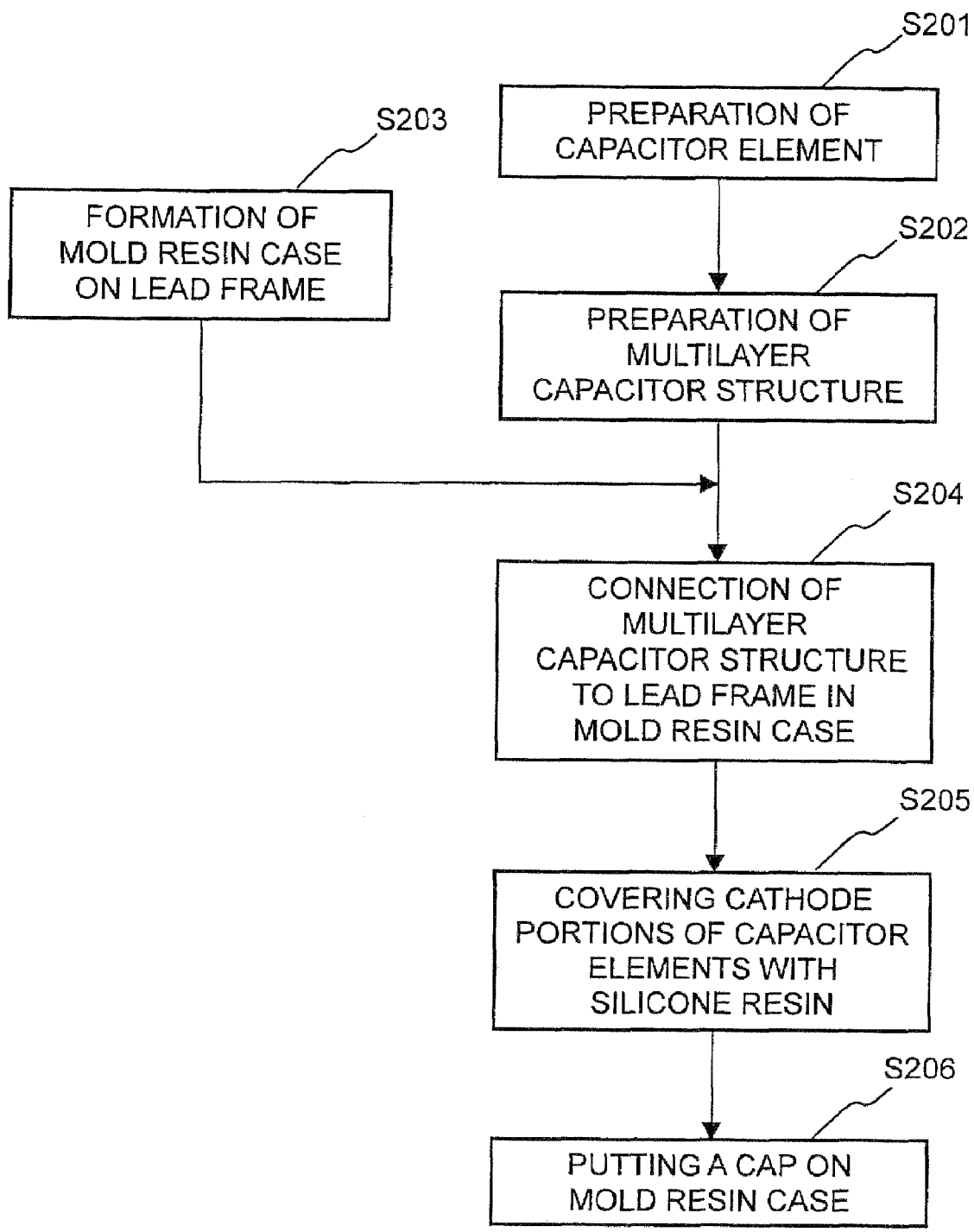
FIG. 9 is a flow chart for describing a production process of the surface-mount capacitor.

Next, description will be made of a method of producing the surface-mount capacitor according to the first embodiment of this invention. At first referring to FIG. 9, an overall process will be described. In a step S201, each capacitor element is produced. In a step S202, a plurality of the capacitor elements are laminated and welded by resistance welding or laser welding to produce the multilayer capacitor structure. In a step S203, the mold resin case is formed on the lead frame by insert molding. In a step S204, the multilayer capacitor structure is connected by the use of the conductive paste to the lead frame exposed on the inner bottom surface of the mold resin case. In a step S205, the cathode portions of the capacitor elements are covered with the silicone resin so that the cathode portions do not contact with air. In a step S206, the cap is put on the mold resin case opened upward.

At first, the capacitor element is produced in the following manner. An anode member including an aluminum foil or sheet is expanded in surface area by etching. Thereafter, an oxide coating film is formed by an electrochemical process (dielectric formation). On the oxide coating film, a conductive polymer layer is formed. Further, a graphite layer and an Ag paste layer are formed as the cathode portion. At opposite ends of the anode member, the anode lead portions are formed via the insulating resin layers. The above-mentioned process is carried out by a known technique.

Next referring to FIGS. 10A, 10B, 10C, 11A, and 11B, the production process will be described more in detail.

Figure 10A:
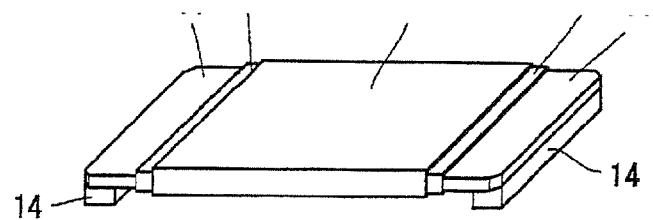
FIG. 10A is a perspective view of a capacitor element with a strip-like plate connected thereto.
Figure 10B:
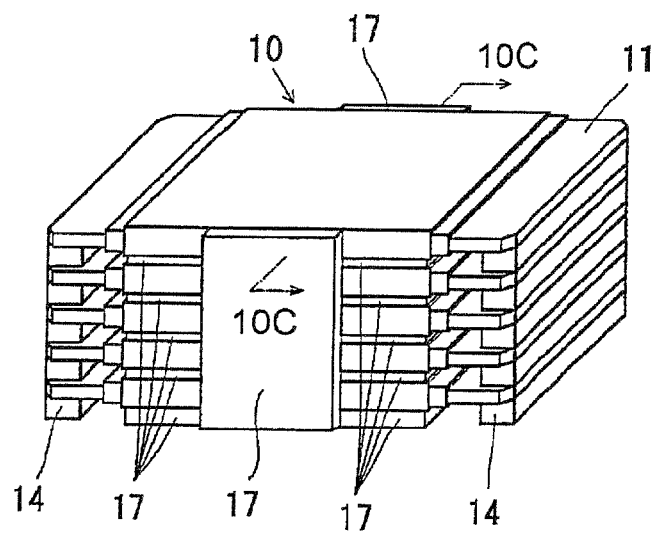
FIG. 10B is a perspective view of a multilayer capacitor structure in which side surfaces and principal surfaces of cathode portions are connected by a conductive paste.
Figure 10C:
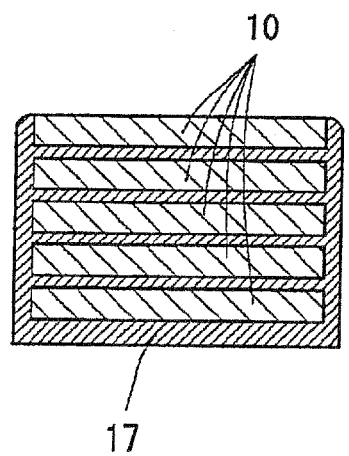
FIG. 10C is a sectional view taken along a line 10C-10C in FIG. 10B.

As illustrated in FIG. 10A, to each of the anode lead portions 11 of the capacitor element, the strip-like plate 14 of copper or copper alloy is welded by resistance welding or laser welding after an etching layer is removed. Next, as illustrated in FIG. 10B, the conductive paste 17 is applied to the cathode portions 12 of the five capacitor elements 10 and the capacitor elements 10 are laminated. At this time, the conductive paste 17 not only connects the principal surfaces of the cathode portions 12 of the capacitor elements 10 but also is applied around the side surface portions of the cathode portions 12 in a belt-like fashion. Thus, as shown in FIG. 10C, the conductive paste 17 is applied so as to surround the cathode portions 12 of the capacitor elements 10. By the above-mentioned electrical connection of the cathode portions 12, ESR can be reduced.

Figure 11A:
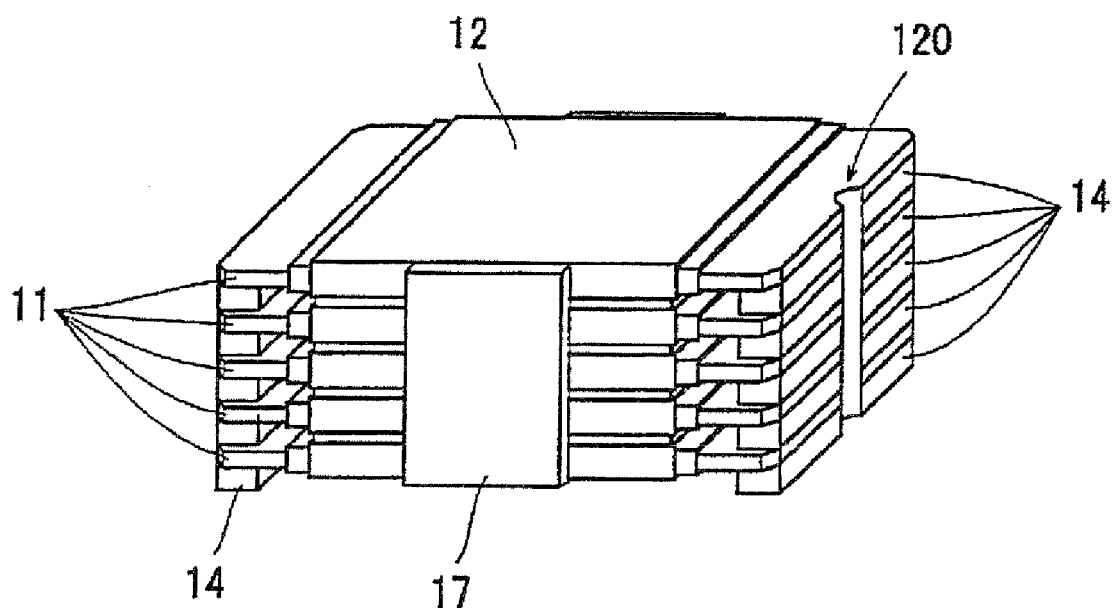
FIG. 11A is a perspective view of the multilayer capacitor structure after anode lead portions are welded together.
Figure 11B:
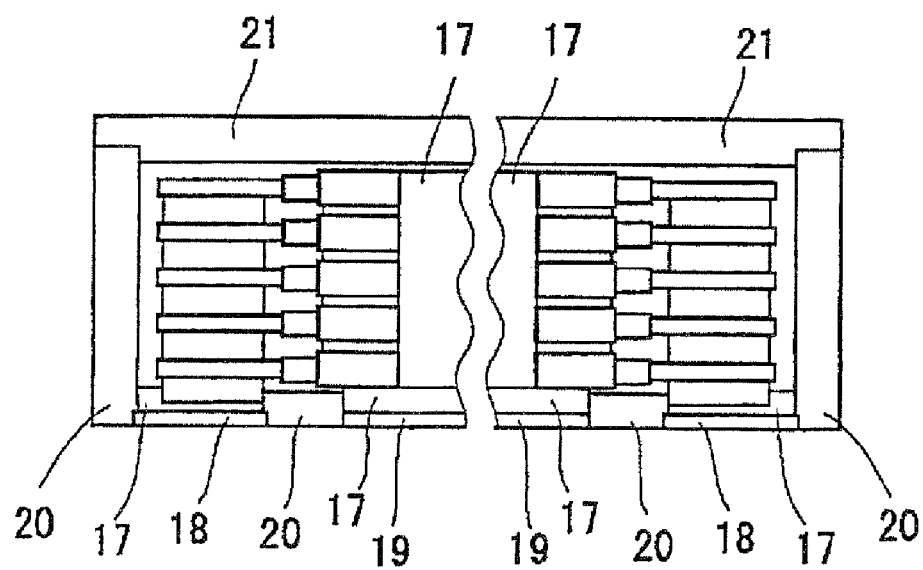
FIG. 11B is a view showing an internal structure of the multilayer capacitor structure in FIG. 11A after it is accommodated in the mold resin case.

In the state illustrated in FIG. 10B, the anode lead portions 11 are pressed against one another and temporarily fixed. In this state, a laser beam is irradiated to a position such that a part of the laser beam spreads beyond end faces of the anode lead portions 11. In this manner, all of the anode lead portions 11 and the strip-like plates 14 are simultaneously welded. If a laser beam is irradiated to an inner position so that a through hole of a closed circule is formed by the laser beam, then a molten part by the laser beam may be confined in the through hole. On the contrary, if the laser beam is irradiated partially beyond the end faces of the anode lead portions 11 as described above, a welding mark 120 is formed to sweep the end faces as illustrated in FIG. 11A. Thus, the molten part is not confined in a through hole and therefore excellent melt-in is performed. A step of connecting the anode lead portions and the cathode portions of the multilayer capacitor structure to the anode terminals 18 and the cathode terminal 19 in the mold resin case 20 is similar to that described above. Thus, the surface-mount capacitor shown in FIG. 11B is obtained.

Figure 12:
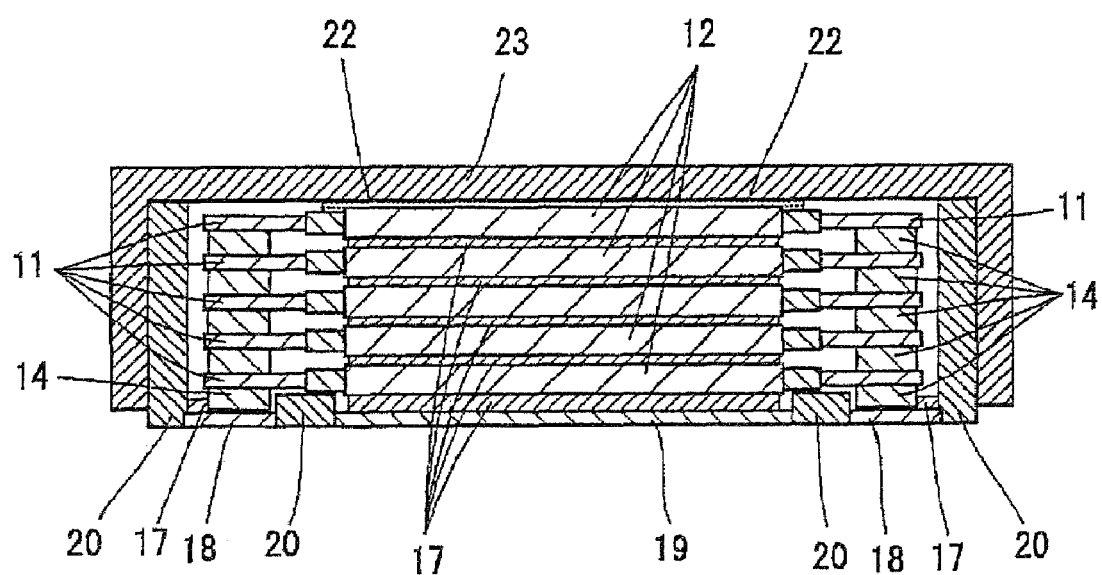
FIG. 12 is a sectional view of a surface-mount capacitor according to a second embodiment of this invention.

Referring to FIG. 12, a surface-mount capacitor according to a second embodiment of this invention is similar to that of the first embodiment except that the cap 21 (FIG. 2A) is replaced by an exterior case 23 of a box-like shape. Similar parts are designated by like reference numerals and description thereof will be omitted.

Figure 13A:
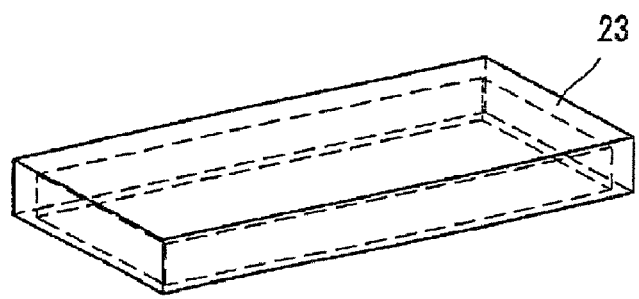
FIG. 13A is a perspective view of an exterior case in the second embodiment of this invention.
Figure 13B:
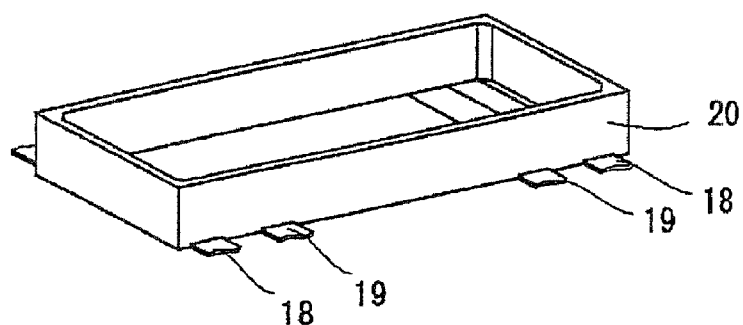
FIG. 13B is a perspective view of a mold resin case and terminals in the second embodiment of this invention.
Figure 14A:
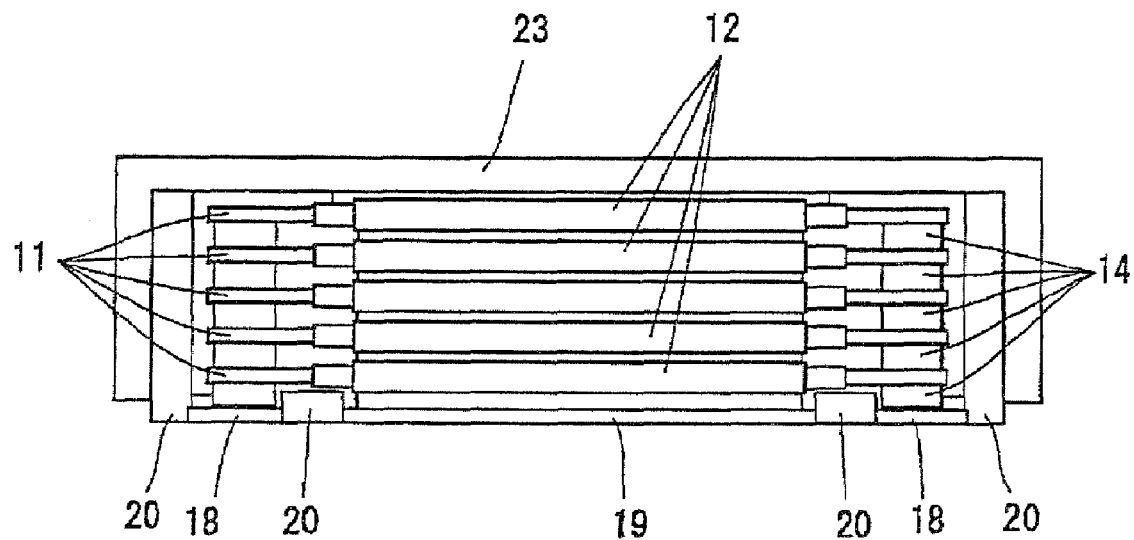
FIG. 14A is a view showing an internal structure of the surface-mount capacitor according to the second embodiment of this invention.
Figure 14B:
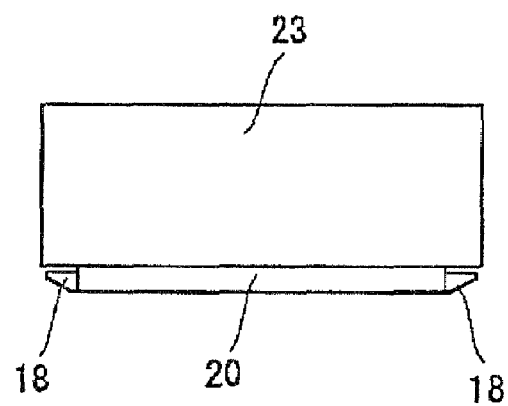
FIG. 14B is a side view of the surface-mount capacitor in FIG. 14A.

The exterior case 23 illustrated in FIG. 13A is fitted over the mold resin case 20 illustrated in FIG. 13B to complete a case assembly. Referring to FIGS. 14A and 14B, the exterior case 23 has a lower end higher than the upper surfaces of the anode and the cathode terminals 18 and 19. With this structure, it is possible to prevent the lower end of the exterior case 23 from contacting the anode or the cathode terminals 18 or 19 due to thermal expansion during reflow soldering to bend the anode or the cathode terminals 18 or 19 so that a main body of the surface-mount capacitor is lifted up. Like in the first embodiment, the end portion of each of the anode terminal 18 and the cathode terminal 19 is provided with the fillet forming portion formed by crushing from a lower side with the plating surface kept intact.

Figure 13C:
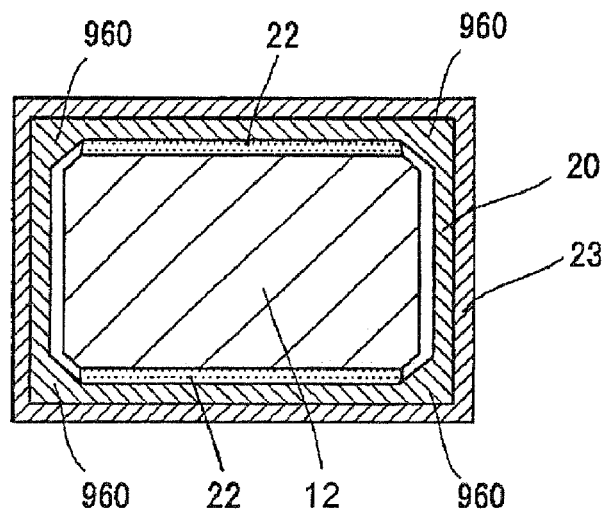
FIG. 13C is a horizontal sectional view of the surface-mount capacitor according to the second embodiment of this invention.
Figure 15A:
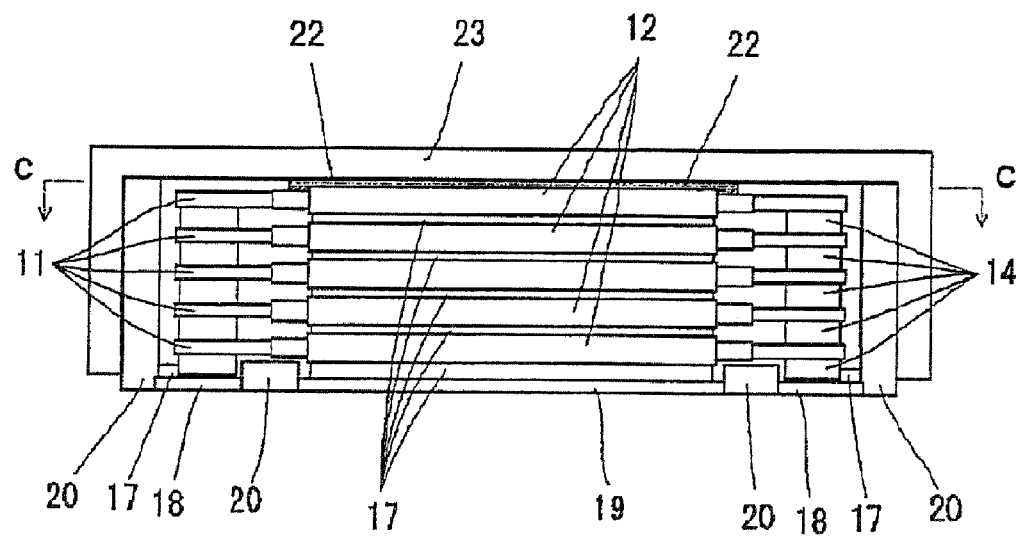
FIG. 15A is a view similar to FIG. 14A when a silicone resin is filled in a gap between the mold resin case and capacitor elements.
Figure 15B:
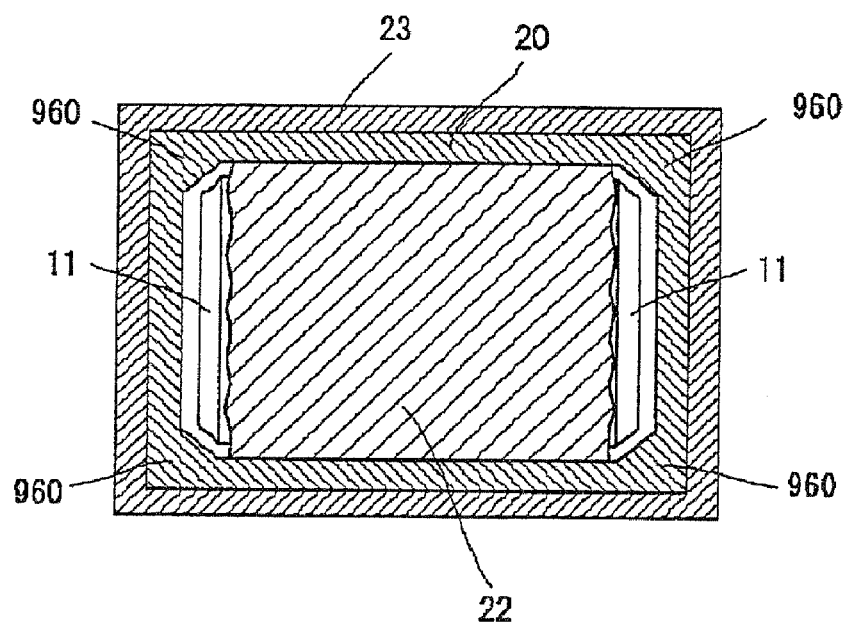
FIG. 15B is a horizontal sectional view on a plane perpendicular to the paper along a line 15B-15B of FIG. 15A.

Hereinafter, description will be made of a structure common to the first embodiment. Referring to FIGS. 15A and 15B, the silicone resin 22 is filled mainly in a gap between the uppermost cathode portion 12 and the exterior case 23 so as to cover the cathode portion 12. As illustrated in FIG. 13C, the silicone resin 22 is also filled in a gap between the capacitor elements and the side wall portion of the mold resin case 20. As shown in FIGS. 13C and 15B, most parts of sides and a top of the multilayer capacitor structure are covered with the silicone resin 22 to fill the gap between the multilayer capacitor structure and the exterior case 23.

Figure 16A:
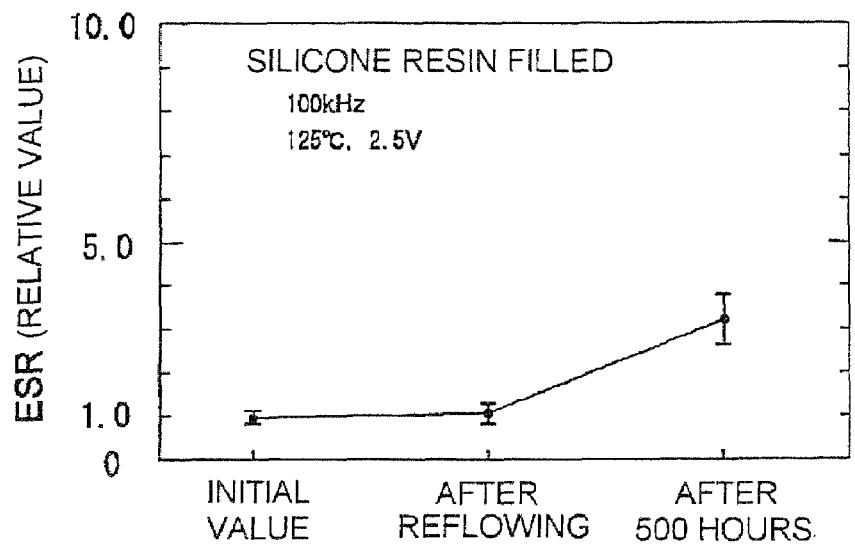
FIG. 16A is a view showing change in ESR in a high-temperature environment in case where the silicone resin is filled.
Figure 16B:
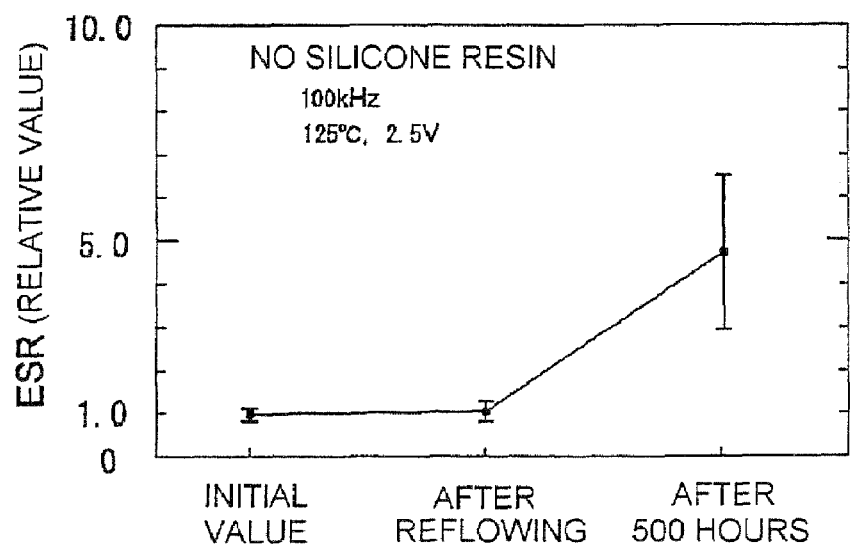
FIG. 16B is a view similar to FIG. 16A in case where the silicone resin is not filled.
Figure 17A:
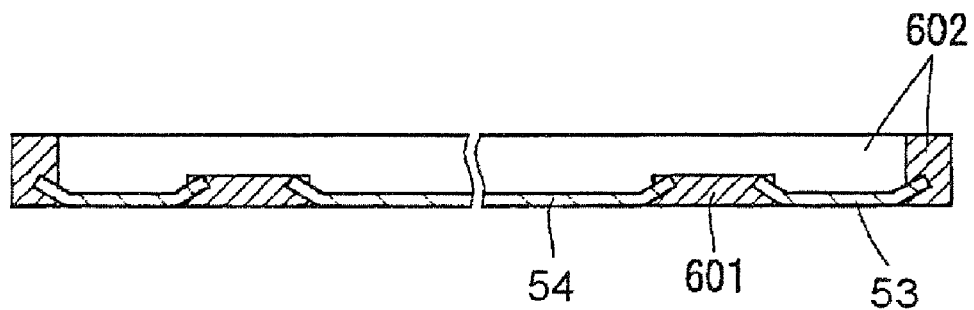
FIG. 17A is a sectional view of a mold resin case of a surface-mount capacitor according to a third embodiment of this invention.
Figure 17B:
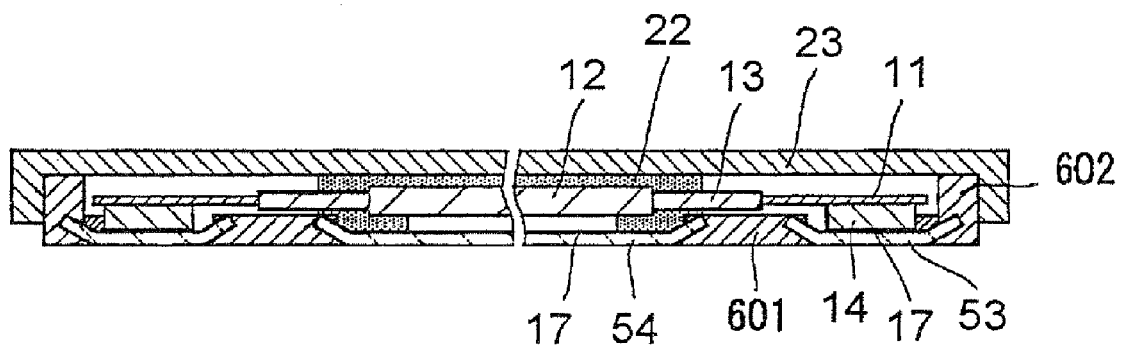
FIG. 17B is a sectional view of the surface-mount capacitor including the mold resin case in FIG. 17A.

Referring to FIGS. 16A and 16B, change in ESR in a high-temperature environment will be described. FIG. 16A shows the case where the silicone resin is filled while FIG. 16B shows the case where the silicone resin is not filled. In the figures, the change in ESR at 100 kHz is shown for 10 samples (1) in an initial state, (2) after reflowing, and (3) after 500 hours under an environmental condition of 125° C. and 2.5V. As seen from the figures, the ESR is about three times the initial value after 500 hours in case where the silicone resin is filled. On the other hand, in case where the silicone resin is not filled, the ESR fluctuates between three times and six times the initial value. Although not shown in the figures, after lapse of 500 hours under the environmental condition of 125° C. and 2.5V, tan δ (dielectric loss tangent) in case where the silicone resin is filled is about ½ as compared with the case where the silicone resin is not filled. Thus, by filling the silicone resin, reaction between the cathode portions and oxygen can be suppressed so that the increase in ESR is suppressed. In addition, an antivibration effect for the capacitor elements is obtained.

As shown in FIG. 13C and 15B, the mold resin case 20 is provided with a plurality of reinforced parts 960 of a triangular cylindrical shape formed at four inside corners of the mold resin case 20 to increase the thickness so that a whole of the mold resin case is given robustness. The shape of the reinforced parts is not particularly limited as far as the thickness is increased. For example, a rounded shape may be adopted. With such reinforced parts, a whole of the case is robust and warping is reduced.

In the surface-mount capacitor according to the second embodiment, a static capacitance of 1000 μF, ESR (at 100 kHz) is 0.8 mΩ, and a leak current of 50 μA (2.5 V applied and measured 5 minutes after) are obtained as typical characteristic values.

As a specific example of positional accuracy of the terminals, in the surface-mount capacitor according to the second embodiment, the positional accuracy of the anode terminals can be improved to ±0.05 mm. As compared with the conventional techniques using ultrasonic welding for connection of the anode lead portions of the capacitor elements, variation in position is improved to about ⅒.

Next, description will be made of a surface-mount capacitor according to a third embodiment of this invention. The third embodiment is similar to the second embodiment except that the surface-mount capacitor is of a single-layer type and that the mold resin case side wall portion 602 is different in height from that of the second embodiment. Production of the capacitor element and welding of the strip-like plate 14 and the anode lead portion 11 are carried out in the manner similar to the first and the second embodiments. Connection of the cathode portion 12 and the cathode terminal forming portion 54 by the conductive paste 17 and connection of the strip-like plate 14 and the anode terminal forming portion 53 by the conductive paste 17 are carried out in the manner similar to the first and the second embodiments. Alternatively, a conductive adhesive such as an epoxy-based adhesive may be used for the above-mentioned connections. The silicone resin 22 is filled in a gap between the capacitor element and an exterior case 605 or the mold resin case so as to surround an upper surface and a side surface of the cathode portion 12.

Either in case of the single-layer structure as in the third embodiment or in case of the multilayer structure as in the first and the second embodiments, a common process can be used except the step of producing the multilayer capacitor structure and the difference in height of the mold resin case and the exterior case. Thus, it is possible to obtain a capacitor series of surface-mount capacitors excellent in productivity.

While this invention has thus far been disclosed in conjunction with the preferred embodiments thereof, it will be readily possible for those skilled in the art to put this invention into practice in various other manners within the scope of the appended claims.

What is claimed is:

1. A method of producing a surface-mount capacitor, comprising the steps of:

producing a capacitor element by forming a surface-expanding etching layer and a dielectric coating film on a plate or a foil of a valve action metal, thereafter isolating an end portion by an insulating resin to form an anode lead portion, and forming a solid electrolyte layer and a conductive material layer on the dielectric coating film at a center;

welding a connecting strip-like plate to the anode lead portion of the capacitor element;

forming a nonconductive case having a bottom portion and a side wall portion on a lead frame provided with an anode terminal forming portion and a cathode terminal forming portion, and exposing an upper surface of the lead frame on an inner bottom surface of the nonconductive case;

connecting the strip-like plate welded to the capacitor element and the cathode portion of the capacitor element to the lead frame in the nonconductive case; and connecting a cap or an exterior case at least covering an upper side of the nonconductive case to the nonconductive case.

2. The method according to claim 1, wherein the strip-like plate is made of copper or copper alloy subjected to plating, the strip-like plate being welded to the anode lead portion by resistance welding after the etching layer of the anode lead portion is removed.

3. The method according to claim 1, wherein the strip-like plate is made of copper or copper alloy subjected to plating, the strip-like plate being welded by laser welding after the etching layer of the anode lead portion is removed.

4. A method of producing a surface-mount capacitor, comprising the steps of:

producing a capacitor element by forming a surface-expanding etching layer and a dielectric coating film on a plate or a foil of a valve action metal, thereafter isolating an end portion by an insulating resin to form an anode lead portion, and forming a solid electrolyte layer and a conductive material layer on the dielectric coating film at a center;

forming a multilayer capacitor structure by laminating the capacitor elements after a connecting strip-like plate is welded to the anode lead portion of each of the capacitor elements;

forming a nonconductive case having a bottom portion and a side wall portion by insert molding on a lead frame provided with an anode terminal forming portion and a cathode terminal forming portion, and exposing an upper surface of the lead frame on an inner bottom surface of the nonconductive case;

connecting the strip-like plate at a lowermost part of the multilayer capacitor structure and the cathode portion of the multilayer capacitor structure to the lead frame in the nonconductive case; and connecting a cap or an exterior case at least covering an upper side of the nonconductive case to the nonconductive case.

5. The method according to claim 4, wherein the strip-like plate is made of copper or copper alloy subjected to plating, the strip-like plate being welded to the anode lead portion by resistance welding after the etching layer of the anode lead portion is removed.

6. The method according to claim 4, wherein the strip-like plate is made of copper or copper alloy subjected to plating, the strip-like plate being welded by laser welding after the etching layer of the anode lead portion is removed.

7. The method according to claim 4, wherein, in the step of forming the multilayer capacitor structure by laminating the capacitor elements after a connecting strip-like plate is welded to the anode lead portion of each of the capacitor elements, laser welding is carried out by setting an irradiating position such that a part of a laser beam section spreads beyond an end of each of the anode lead portion and the strip-like plate and irradiating the laser beam so that the laser beam penetrates or passes through the anode lead portions and the strip-like plates of all the capacitor elements and that a welded portion is exposed on an end face of the multilayer capacitor structure.

8. The method according to claim 4, wherein, in the step of forming the multilayer capacitor structure by laminating the capacitor elements after a connecting strip-like plate is welded to the anode lead portion of each of the capacitor elements, connection of principal surfaces of the cathode portion of the capacitor elements and connection of side surfaces of the cathode portions are simultaneously carried out by the use of a same conductive paste.

\* \* \* \* \*